US012009748B2

(12) United States Patent
Li et al.

(10) Patent No.: US 12,009,748 B2
(45) Date of Patent: Jun. 11, 2024

(54) VOLTAGE REGULATION APPARATUS, CHIP AND ELECTRONIC DEVICE (71) Applicant: Chipone Technology (Beijing) Co., LTD., Beijing (CN)

(72) Inventors: Maoxu Li, Beijing (CN); Dong Li, Beijing (CN)

(73) Assignee: Chipone Technology (Beijing) Co., LTD., Beijing (CN)

( * ) Notice: Subject to any disclaimer, the term of this patent is extended or adjusted under 35 U.S.C. 154(b) by 158 days.

(21) Appl. No.: 17/736,063

(22) Filed: May 3, 2022

(65) Prior Publication Data
US 2022/0263413 A1   Aug. 18, 2022

Related U.S. Application Data (63) Continuation of application No. PCT/CN2020/132715, filed on Nov. 30, 2020.

(30) Foreign Application Priority Data

Dec. 13, 2019  (CN) .......................... 201911284268.1

(51) Int. Cl.
H02M 3/156      (2006.01)
G05F 1/44       (2006.01)
(Continued)

(52) U.S. Cl.
CPC .............. *H02M 3/158* (2013.01); *G05F 1/44* (2013.01); *H02M 1/0025* (2021.05);
(Continued)

(58) Field of Classification Search
CPC .. H02M 1/0009; H02M 1/0025; H02M 3/156; H02M 3/1566; H02M 3/158; H02M 3/1588
See application file for complete search history.

(56) References Cited

U.S. PATENT DOCUMENTS 6,593,725 B1    7/2003  Gallagher
2008/0118672 A1*  5/2008  Kuroda ................. D01D 5/253
                                                        428/97
(Continued)

FOREIGN PATENT DOCUMENTS

CN    101262174 A    9/2008
CN    102185479 A    9/2011
(Continued)

OTHER PUBLICATIONS

International Search Report and Written Opinion issued in App. No. PCT/CN2020/132715, dated Feb. 25, 2021, 12 pages.
(Continued)

*Primary Examiner* — Gary L Laxton
(74) *Attorney, Agent, or Firm* — Butzel Long (57) ABSTRACT

The present disclosure relates to a voltage regulation apparatus, a chip and an electronic device. The apparatus comprises: a voltage output module; a first voltage generation module; a second voltage generation module; a voltage regulation module used for regulating a first comparison voltage according to an input voltage so that the first voltage generation module outputs a regulated first comparison voltage, or regulating a second comparison voltage according to the input voltage so that the second voltage generation module outputs a regulated second comparison voltage; and a control signal generation module used for outputting a control signal according to the regulated first comparison voltage or the regulated second comparison voltage, so that the voltage output module obtains an output voltage according to the control signal and the input voltage. The apparatus of the present disclosure can quickly respond to the change of the input voltage, regulate the control signal and improve the line voltage transient response, so that the voltage output
(Continued)

module can still provide a stable output when the input voltage changes.

20 Claims, 7 Drawing Sheets

(51) Int. Cl.
*H02M 1/00* (2006.01)
*H02M 3/158* (2006.01)

(52) U.S. Cl.
CPC .......... *H02M 1/0009* (2021.05); *H02M 3/156* (2013.01); *H02M 3/1566* (2021.05)

(56) References Cited

U.S. PATENT DOCUMENTS

| | | |
|---|---|---|
| 2010/0231183 A1 | 9/2010 | Jan |
| 2012/0049810 A1 | 3/2012 | Huang |
| 2013/0021009 A1* | 1/2013 | Waltman ............ H02M 3/1584 323/271 |
| 2013/0088209 A1 | 4/2013 | Huang |
| 2017/0242449 A1 | 8/2017 | Chen |
| 2020/0119641 A1* | 4/2020 | Liang .................... H02M 3/157 |

FOREIGN PATENT DOCUMENTS

| | | |
|---|---|---|
| CN | 103208934 A | 7/2013 |
| CN | 105075088 A | 11/2015 |
| CN | 105337500 A | 2/2016 |
| CN | 106329924 A | 1/2017 |
| CN | 107102666 A | 8/2017 |
| CN | 109378969 A | 2/2019 |
| CN | 110518799 A | 11/2019 |
| EP | 2424097 A2 | 2/2012 |
| JP | 2005020994 A | 1/2005 |
| JP | 2014207741 A | 10/2014 |
| JP | 2015119550 A | 6/2015 |
| JP | 2017099156 A | 6/2017 |
| JP | 2019058027 A | 4/2019 |
| KR | 20100089820 A | 8/2010 |
| KR | 20120024432 A | 3/2012 |
| WO | 2016136653 A1 | 9/2016 |

OTHER PUBLICATIONS

Japanese Office Action (including English translation) issued in App. No. JP2022524196, dated Jun. 13, 2023, 7 pages.
Korean Office Action (including English translation) issued in App. No. KR1020227024051, dated Feb. 19, 2024, 10 pages.

* cited by examiner

VOLTAGE REGULATION APPARATUS, CHIP AND ELECTRONIC DEVICE

This application is a continuation application of International Application No. PCT/CN2020/132715 filed on Nov. 30, 2020, which claims priority of Chinese application No. 201911284268.1 filed on Dec. 13, 2019, the contents all of which are incorporated herein by reference.

TECHNICAL FIELD

The present disclosure relates to the technical filed of integrate circuits, and particularly to a voltage regulation apparatus, a chip, and an electronic device.

BACKGROUND ART

At present, a system with a DC-DC output as a power supply requires higher and higher output accuracy and ripple for the DC-DC, a requirement for a response to a load-transient and a line-transient of the DC-DC are also increasing correspondingly. An output voltage of the DC-DC should be as small as possible when a load current or an input voltage of the DC-DC changes abruptly. However, in the relevant technology, when the input voltage of the DC-DC jumps, jitter of the output voltage is relatively large and thus a stable output voltage cannot be provided.

SUMMARY OF THE INVENTION

Technical Problem

In view of this, the technical problem to be solved by the present disclosure is how to reduce the jitter of the output voltage when the input voltage jumps so as to provide a stable output voltage.

Solution

In order to solve the above technical problem, there is provided a voltage regulation apparatus according to an embodiment of the present disclosure, comprising:

a voltage output module configured to receive an input voltage and a control signal, and obtain an output voltage based on the control signal and the input voltage;

a first voltage generation module, electrically connected to the voltage output module, is configured to detect a current of the voltage output module to obtain a detected current, and obtain a first comparison voltage based on the detected current;

a second voltage generation module, electrically connected to the voltage output module, is configured to generate second comparison voltage based on the output voltage;

a voltage regulation module is configured to regulate the first comparison voltage based on the input voltage, such that the first voltage generation module outputs a regulated first comparison voltage, or regulates the second comparison voltage based on the input voltage such that the second voltage generation module outputs a regulated second comparison voltage; and a control signal generation module, electrically connected to the first voltage generation module and the second voltage generation module, is configured to output a control signal based on the regulated first comparison voltage or the regulated second comparison voltage, such that the voltage output module obtains an output voltage based on the control signal and the input voltage.

For the above apparatus, in a possible implementation, the control signal generation module includes a comparator and a PWM (Pulse Width Modulation) signal generator, and the control signal includes a PWM signal, wherein:

a first input terminal of the comparator is electrically connected to the first voltage generation module, a second input terminal of the comparator is electrically connected to the second voltage generation module, and an output terminal of the comparator electrically connected to an input terminal of the PWM signal generator, and the comparator is configured to compare an output signal of the first voltage generation module with an output signal of the second voltage generation module and output a comparison result; and an output terminal of the PWM signal generator is electrically connected to the voltage output module, and the PWM signal generator is configured to regulate a duty cycle of the PWM signal based on the comparison result output from the comparator, and output the control signal with regulated by the duty cycle.

For the above apparatus, in a possible implementation, the first voltage generation module includes a first comparator, a first resistor, a first switch, a first current source, and a first current detection unit, wherein:

a first terminal of the first capacitor is electrically connected to a first terminal of the first switch, a positive pole of the first current source, and the first input terminal of the comparator, a second terminal of the first capacitor is electrically connected to a second terminal of the first switch, a first terminal of the first resistor, and the first current detection unit, and a second terminal of the first resistor is grounded;

the first current detection unit, electrically connected to the voltage output module, is configured to obtain the detected current and output the detected current to a first terminal of the first resistor; and when the first switch is turned off, a first terminal of the first capacitor outputs the first comparison voltage to the first input terminal of the comparator.

For the above apparatus, in a possible implementation, the second voltage generation module comprises a first error amplifier, a second resistor, and a third resistor, and the voltage regulation module comprises a first operational amplifier, a first transistor, and a fourth resistor, wherein:

a non-inverting input terminal of the first error amplifier is electrically connected to a second terminal of the second resistor and a first terminal of the third resistor, an inverting input terminal of the first error amplifier is configured to receive a reference voltage, and an output terminal of the first error amplifier is electrically connected to a grid of the first transistor;

a drain of the first transistor is configured to receive power supply voltage, and a source of the first transistor is electrically connected to a first terminal of the fourth resistor, an output terminal of the first operational amplifier, and the second input terminal of the comparator;

a non-inverting input terminal of the first operational amplifier is configured to input the input voltage, and an inverting input terminal of the first operational amplifier, a second terminal of the third resistor, and a second terminal of the fourth resistor are grounded.

For the above apparatus, in a possible implementation, the first voltage generation module comprises a fifth resistor, a second capacitor, a second current source, a first voltage source, a second switch, a third switch, and a second current detection unit, wherein:

a first terminal of the second capacitor is electrically connected to a first terminal of the second switch, a first terminal of the third switch, a negative pole of the second current source and the first input terminal of the comparator, the second terminal of the second capacitor is electrically connected to a second terminal of the second switch, a first terminal of the fifth resistor, and the second current detection unit, a second terminal of the third switch is electrically connected to a position electrode of the first voltage source, and the positive pole of the second current source, a negative pole of the first voltage source, and a second terminal of the fifth resistor are grounded;

the second current detection unit is configured to obtain the detected current and output the detected current to a first terminal of the fifth resistor, and when the second switch and the third switch are turned off, the first terminal of the second capacitor is configured to output the first comparison voltage to the first input terminal of the comparator.

For the above apparatus, in a possible implementation, the second voltage generation module includes a sixth resistor, a seventh resistor, and a second error amplifier, and the voltage regulation module includes an eighth resistor, a second operational amplifier, and a second transistor, wherein:

a non-inverting input terminal of the second error amplifier is electrically connected to a second terminal of the sixth resistor and a first terminal of the seventh resistor, the inverting input terminal of the second error amplifier is configured to receive a reference voltage, an output terminal of the second error amplifier is electrically connected to a grid of the second transistor, a drain of the second transistor is configured to receive the power supply voltage, and a source of the second transistor is electrically connected to a first terminal of the eighth resistor, and an inverting input terminal of the second operational amplifier is configured to receive the input voltage, a non-inverting input terminal of the second operational amplifier and a second terminal of the seventh resistor are grounded, and an output terminal of the second operational amplifier, electrically connected to a second terminal of the eighth resistor and the second input terminal of the comparator, is configured to output the regulated second comparison voltage to a second input terminal of the second comparator.

For the above apparatus, in a possible implementation, the first voltage generation module comprises a ninth resistor, a third capacitor, a fourth switch, a third current source, and a third current detection unit, and the voltage regulation module includes a third operational amplifier, wherein:

a first terminal of the third capacitor is electrically connected to a first terminal of the fourth switch, a positive pole of the third current source, and the first input terminal of the comparator;

the third current detection unit electrically connected to the voltage output module, a first terminal of the ninth resistor, a second terminal of the third capacitor, and a second terminal of the fourth switch is configured to obtain the detected current and output the detected current to a first terminal of the ninth resistor;

a non-inverting input terminal of the third operational amplifier is configured to input the input voltage, an inverting input terminal of the third operational amplifier and a second terminal of the ninth resistor are grounded; and wherein, when the fourth switch is turned off, the first terminal of the third capacitor outputs the regulated first comparison voltage to the first terminal of the comparator.

For the above apparatus, in a possible implementation, the second voltage generation module comprises a third error amplifier, a tenth resistor, and an eleventh resistor, wherein:

a first terminal of the tenth resistor is configured to input the output voltage, a second terminal of the tenth resistor is electrically connected to a first terminal of the eleventh resistor and a non-inverting input terminal of the third error amplifier, an inverting input terminal of the third error amplifier is configured to input a reference voltage, a second terminal of the eleventh resistor is grounded, an output terminal of the third error amplifier, electrically connected to the second input terminal of the comparator, is configured to output the second comparator voltage to the second input terminal of the comparator.

For the above apparatus, in a possible implementation, the first voltage generation module comprises a twelfth resistor, a fourth capacitor, a fifth switch, a sixth switch, a fourth current source, a second voltage source, and a fourth current detection unit, and the voltage regulation module includes a fourth operational amplifier, wherein:

a first terminal of the fourth capacitor is electrically connected to a first terminal of the fifth switch, a first terminal of the sixth switch, a negative pole of the fourth current source, and the first input terminal of the comparator, a second terminal of the fourth capacitor is electrically connected to a first terminal of the twelfth resistor, an output terminal of the fourth operational amplifier, a second terminal of the fifth switch, and the fourth current detection unit, and the fourth current detection unit, further electrically connected to the voltage output module, is configured to obtain the detected current and output the detected current to a first terminal of the twelfth resistor;

a second terminal of the sixth switch is electrically connected to the positive pole of the second voltage source, a negative pole of the second voltage source, a positive pole of the fourth current source, a second terminal of the twelfth resistor, and an inverting input terminal of the fourth operational amplifier are grounded, and a non-inverting input terminal of the fourth operational amplifier receives the input voltage; and when the fifth switch and the sixth switch are turned off, the first terminal of the fourth capacitor outputs the regulated first comparison voltage to a first input terminal of the comparator.

To solve the above technical problem, there is provided a chip according to another embodiment of the present disclosure, comprising:

the voltage regulation apparatus.

To solve the above technical problem, there is provided an electronic device according to another embodiment of the present disclosure, comprising:

the chip.

The voltage regulation module of the voltage regulation apparatus proposed in this embodiment of the present disclosure can be configured to be connected to a first voltage generation module or a second voltage generation module as required. A sensing amount can be obtained based on sensing of the input voltage to regulate the first comparison voltage or the second comparison voltage input to the control signal generation module. In such a way, the control voltage generation module can quickly respond to the change of the input voltage, regulate the control signal and improve the line voltage transient response, so that the voltage output module can still provide a stable output when the input voltage is changed.

Other features and aspects of the present disclosure will become clear from the detailed description of exemplary embodiments with reference to the accompanying drawings below.

BRIEF DESCRIPTION OF THE DRAWINGS

The accompanying drawings, which are included in and form part of the description, together with the description, illustrate exemplary embodiments, features and aspects of the present disclosure and are used to explain the principles of the present disclosure.

DETAILED DESCRIPTION OF EMBODIMENTS

Various exemplary embodiments, features and aspects of the present disclosure will be described in detail below with reference to the accompanying drawings. The same reference signs in the accompanying drawings indicate functionally identical or similar elements. Although various aspects of the embodiments are illustrated in the accompanying drawings, it is not necessary to draw the accompanying drawings to scale unless specifically particularly indicated.

The term "exemplary" is used herein exclusively to mean "used as an example, embodiment, or exemplary". Any embodiment illustrated herein as "exemplary" does not need to be construed as superior or better than other embodiments.

In addition, numerous specific details are given in the specific embodiments below to better illustrate the present disclosure. It should be understood by those skilled in the art that the present disclosure can be implemented equally well without certain specific details. In some embodiments, methods, means, elements and circuits well-known to those skilled in the art are not described in detail in order to bring out the main thrust of the disclosure.

Figure 1:
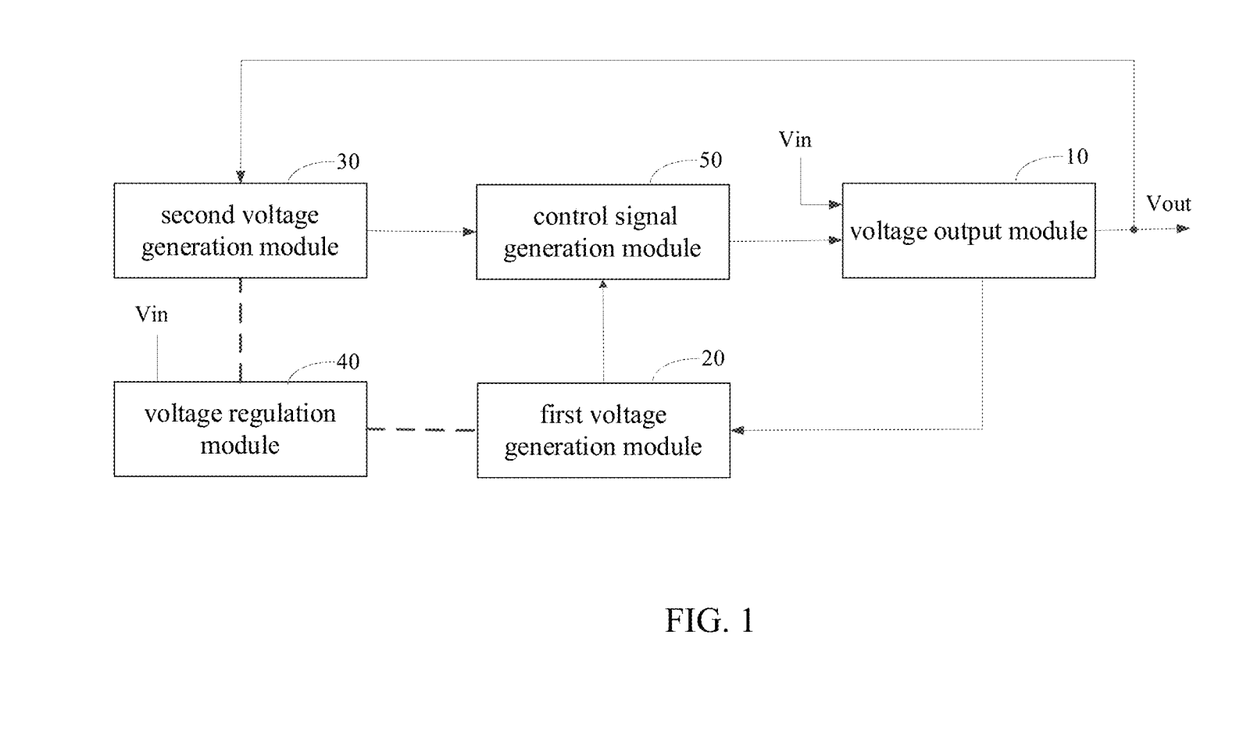
FIG. 1 is a schematic diagram illustrating a voltage regulation apparatus according to an embodiment of the present disclosure.

Referring to FIG. 1, it is a schematic diagram illustrating a voltage regulation apparatus according to an embodiment of the present disclosure.

As illustrated in FIG. 1, the apparatus includes:

a voltage output module 10 configured to receive an input voltage Vin and a control signal to obtain an output voltage Vout based on the control signal and the input voltage Vin;

a first voltage generation module 20, electrically connected to the voltage output module 10 and configured to detect a current of the voltage output module 10 to obtain a detected current, and obtain a first comparison voltage based on the detected current;

a second voltage generation module 30, electrically connected to the voltage output module 10 and configured to generate a second comparison voltage based on the output voltage Vout;

a voltage regulation module 40 configured to regulate the first comparison voltage based on the input voltage Vin such that the first voltage generation module 20 outputs the regulated first comparison voltage, or regulate the second comparison voltage based on the input voltage Vin such that the second voltage generation module 30 outputs the regulated second comparison voltage; and a control signal generation module 50, electrically connected to the first voltage generation module 20 and the second voltage generation module 30 and configured to output a control signal based on the regulated first comparison voltage or the regulated second comparison voltage such that the voltage output module 10 obtains the output voltage Vout based on the control signal and the input voltage Vin.

The voltage regulation module of the voltage regulation apparatus proposed in this embodiment of the present disclosure can be configured to be connected to the first voltage generation module 20 or the second voltage generation module 30 as required. A sensing amount can be obtained based on a sensing of the input voltage Vin to regulate the first comparison voltage or the second comparison voltage input to the control signal generation module 50. In such a way, the control voltage generation module 30 can quickly respond to the change of the input voltage Vin, regulate the control signal and improve the line voltage transient response, so that the voltage output module 10 can still provide a stable output when the input voltage Vin is changed.

The voltage regulation apparatus can be provided in an electronic device which can also be referred to as a mobile device. The mobile device can refer to various forms of an access mobile device, a user unit, a user equipment, a subscriber station, a mobile station, a MS (Mobile Station), a remote station, a remote mobile equipment, a mobile equipment, a user mobile equipment, a terminal equipment, a wireless communication equipment, a user agent, or a user device. A user device can also be a cellular telephone, a cordless phone, a SIP (Session Initiation Protocol) phone, a WLL (Wireless Local Loop) station, a PDA (Personal Digital Assistant), a handheld device with wireless communication function, a computing device, or other processing devices connected to a wireless modem, in-vehicle devices, wearable devices, user devices in future 5G networks or future evolved PLMN (Public Land Mobile Network), and the like, which is not limited by this embodiment.

The voltage regulation apparatus proposed in the embodiments of the present disclosure has various possible implementations to adapt to different environments. An exemplary introduction of possible implementations will be detailed as below.

Figure 2:
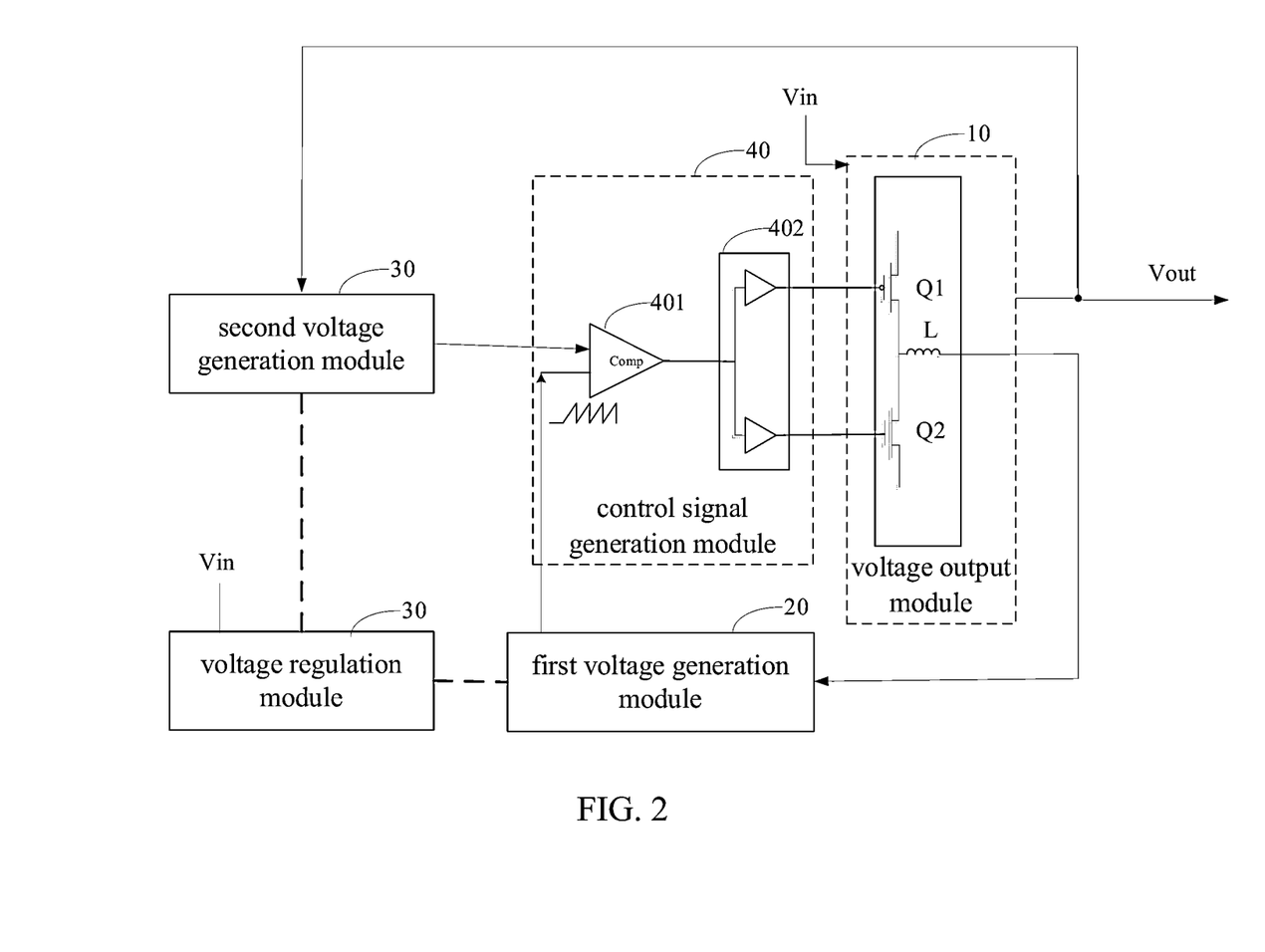
FIG. 2 is a schematic diagram illustrating a voltage regulation apparatus according to an embodiment of the present disclosure.

Referring to FIG. 2, it is a schematic diagram illustrating a voltage regulation apparatus according to an embodiment of the present disclosure.

In a possible embodiment, as shown in FIG. 2, the control signal generation module can include a comparator 401 and a PWM (Pulse Width Modulation) signal generator 402, and the control signal includes a PWM signal, where:

a first input terminal of the comparator 401 is electrically connected to the first voltage generation module 20, a second input terminal of the comparator 401 is electrically connected to the second voltage generation module 30, an output terminal of the comparator 401 is electrically connected to an input terminal of the PWM signal generator 402, and the comparator 401 is configured to compare an output signal of the first voltage generation module 20 with an output signal of the second voltage generation module 30 to output the comparison result; and an output terminal of the PWM signal generator 402 is electrically connected to the voltage output module, and the PWM signal generator 402 is configured to regulate a duty cycle of the PWM signal based on the comparison result output from the comparator 401 to output the control signal having the regulated duty cycle.

It should be noted that the PWM generator 402 shown in the control signal generation module 50 as shown in FIG. 2 schematically illustrates a driving stage, and the PWM generator 402 can also include other elements and components, which are not limited by this disclosure. The control signal generation module 50 can also be implemented in other manners, which are not limited by this disclosure.

In a possible implementation, as shown in FIG. 2, the voltage output module 10 can include a transistor Q1, a transistor Q2, and an inductor L, the control signal generated by the control signal generation module 50 can be used to control a conduction state of the transistor Q1 and the transistor Q2 to output the output voltage Vout, and the first voltage generation module 20 can detect a current on the inductor L to obtain the detected current.

It should be understood that the above description of the voltage output module 10 is exemplary. In other embodiments, the voltage output module can be implemented in a variety of manners, which is not limited by this disclosure.

For the purpose of description, this disclosure firstly describes the control signal generation module 50, and then possible implementations of the first voltage generation module 20, the second voltage generation module 20, the second voltage generation module 30, and the voltage regulation module 40 will be exemplarily introduced.

Figure 3:
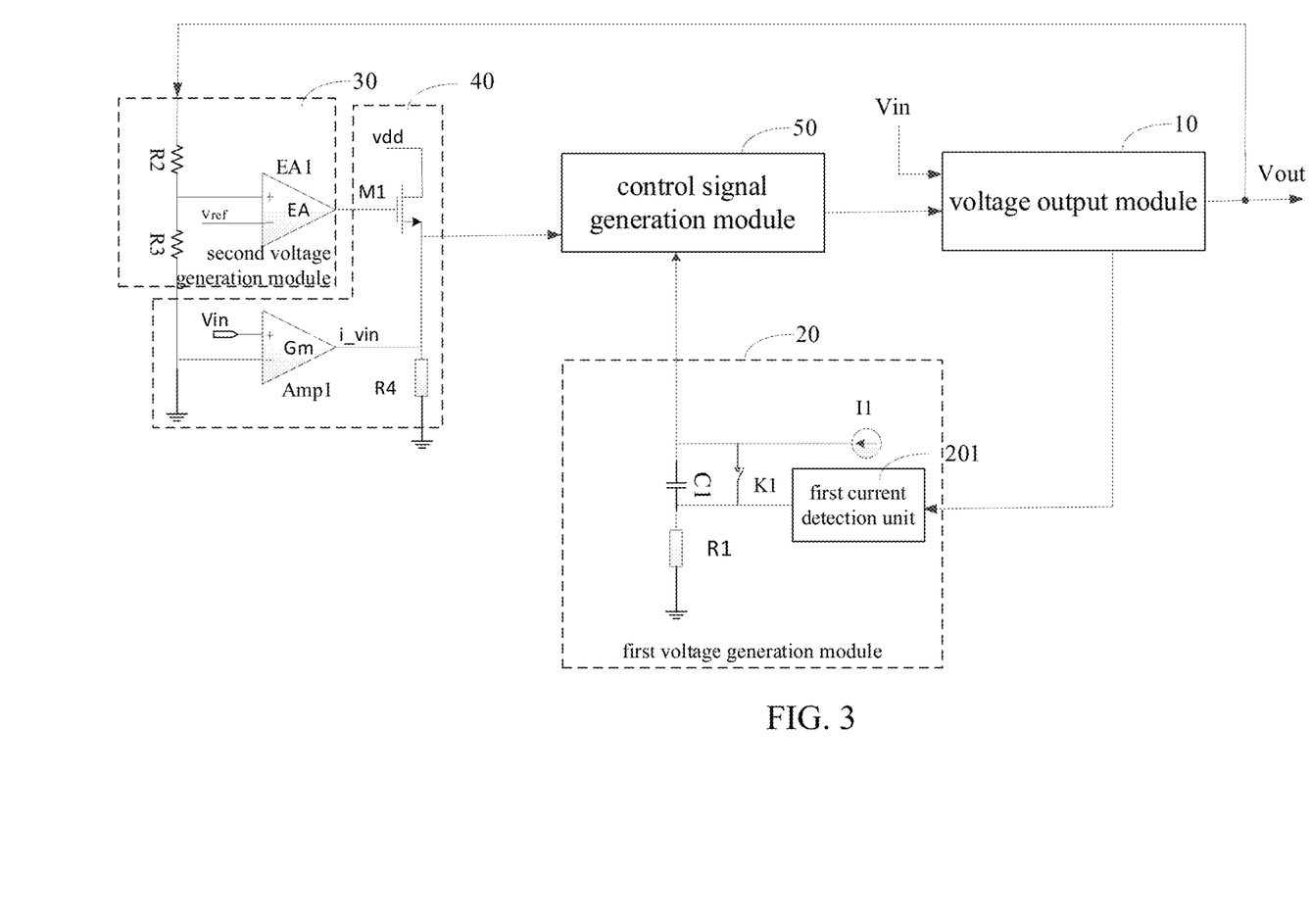
FIG. 3 is a schematic diagram illustrating a voltage regulation apparatus according to an embodiment of the present disclosure.

Referring to FIG. 3, it is a schematic diagram illustrating a voltage regulation apparatus according to an embodiment of the present disclosure.

In a possible embodiment, as shown in FIG. 3, the first voltage generation module 20 can include a first capacitor C1, a first resistor R1, a first switch K1, a first current source I1, and a first current detection unit 201, where:

a first terminal of the first capacitor C1 is electrically connected to a first terminal of the first switch K1, a positive pole of the first current source I1, and the first input terminal of the comparator (not shown in FIG. 3), a second terminal of the first capacitor C1 is electrically connected to a second terminal of the first switch K1, a first terminal of the first resistor R1, and the current detection unit 201, and the second terminal of the first resistor is grounded;

the current detection unit 201 is electrically connected to the voltage output module 10 and configured to obtain the detected current and output the detected current to the first terminal of the first resistor R1; and in response to the first switch K1 being turned off, the first terminal of the first capacitor C1 outputs the first comparison voltage to the first input terminal of the comparator.

In a possible embodiment, as shown in FIG. 3, the second voltage generation module 30 can include a first error amplifier EA1, a second resistor R2, and a third resistor R3, and the voltage regulation module 40 can include a first operational amplifier Amp1, a first transistor M1, and a fourth resistor R4, where:

a non-inverting input terminal of the first error amplifier EA1 is electrically connected to a second terminal of the second resistor R2 and a first terminal of the third resistor R3, an inverting input terminal of the first error amplifier EA1 is configured to receive a reference voltage Vref, and an output terminal of the first error amplifier EA1 is electrically connected to a grid of the first transistor M1;

a drain of the first transistor M1 is configured to receive a power supply voltage vdd, and a source of the first transistor M1 is electrically connected to all of a first terminal of the fourth resistor R4, an output terminal of the first operational amplifier Amp1, and the second input terminal of the comparator;

a non-inverting input terminal of the first operational amplifier Amp1 is configured to input the input voltage Vin, and an inverting input terminal of the first operational amplifier Amp1, a second terminal of the third resistor R3, and a second terminal of the fourth resistor R4 are grounded.

As shown in FIG. 3, the voltage regulation module 40 is electrically connected to the second voltage generation module 30 and can regulate the second comparison voltage output from the second voltage generation module 30 to offset an amount of change in the input voltage Vin, such that that the apparatus can respond quickly to the change in the input voltage Vin.

In one example, as shown in FIG. 3, the first detection unit 201 in the first voltage generation module 20 can sample the current of the voltage output module 10 (which may be for example a rising edge of the inductor current) to obtain the detected current and input the detected current to the first terminal of the first resistor R1. When the first switch K1 is turned off, the current output from the first current source can be input to the first terminal of the first capacitor C1 as a ramp compensation current.

In an example, if the input voltage Vin jumps, for example, from Vin1 to Vin2, the amount of change of the input voltage Vin may be expressed as $\Delta Vin = V_{in2} - V_{in1}$. In this case, the duty cycle of the control signal (PWM signal) output by the control signal generation module 50 changes from $D_1$ to $D_2$.

When Vin=Vin1, the input voltage at the first input terminal of the comparator in the control signal generation module 50 can be expressed as $V_{sum1} = V_{ramp1} + V_{sense1}$; when Vin=Vin2, the input voltage at the second input terminal of the comparator can be expressed as $V_{sum2} = V_{ramp2} + V_{sense2}$ where $V_{ramp}$ (including $V_{ramp1}$ and $V_{ramp2}$) can indicate a voltage difference across the first capacitor C1 and $V_{sense}$ (including $V_{sense1}$ and $V_{sense2}$) can indicate a voltage difference across the first resistor R1. When the input voltage Vin changes from Vin1 to Vin2, the amount of change in input voltage at the first input terminal can be expressed as $\Delta V_{sum} = V_{sum.vin2} - V_{sum.vin1} = \Delta V_{ramp} + \Delta V_{sense}$, where $\Delta V_{ramp} = V_{ramp2} - V_{ramp1}$, $\Delta V_{sense} = V_{sense2} - V_{sense1}$.

As shown in FIG. 3, an embodiment of the present disclosure may electrically connect the voltage regulation module 40 to the output terminal of the second voltage generation module to compensate for the second comparison voltage output by the second voltage generation module 30.

When the input voltage Vin=Vin1, the input voltage at the second input terminal of the comparator of the control signal generation module 50 can be expressed as $V_{comp1} = V_{ea\_out1} - V_{th} + V_{in1} * gm * R_{comp}$, where "*" indicates a multiplication operation; when Vin=Vin2, the input voltage of the second input terminal of the comparator of the control signal generation module 50 can be expressed as $V_{comp2}=V_{ea\_out2}-V_{th}+V_{in2}*gm1*R4$, where gm1 indicates transconductance of the first operational amplifier Amp1, $V_{th}$ indicates a threshold voltage of the first transistor M1, $V_{ea\_out1}$ and $V_{ea\_out2}$ indicate two times of outputs of the first error amplifier EA1, and R4 indicates a resistance of the fourth resistor R4. Thus, the change of amount in the input voltage at the second input terminal can be obtained as $\Delta V_{comp}=V_{comp2}-V_{comp1}=\Delta V_{ramp}+\Delta V_{sense}$, i.e. $\Delta V_{comp}=V_{ea\_out2}-V_{ea\_out1}-\Delta V_{in}*gm*R_{comp}$.

This embodiment of the present disclosure can select an appropriate first operational amplifier Amp' and a fourth resistor R4 to satisfy: $\Delta V_{in}*gm*R_{comp}=\Delta V_{ramp}+\Delta V_{sense}$. By such a configuration, the embodiment of the present disclosure can enable the voltage changes at the first input terminal and the second input terminal of the comparator of the control signal generation module 50 to be synchronized, such that it is possible to generate a control signal that changes with the input voltage Vin (the duty cycle of the PWM signal changes with the input voltage Vin), thereby reducing jitter of the output voltage Vout.

It should be noted that the present disclosure does not limit the specific implementation of the first detection unit 202 and those skilled in the art can implement detection of the current of the voltage output module 10 (inducted current) with respect to relevant technology.

The voltage regulation apparatus described above can be applied in a peak current sampling scenario. Below is an exemplary description of a valley current sampling scenario.

Figure 4:
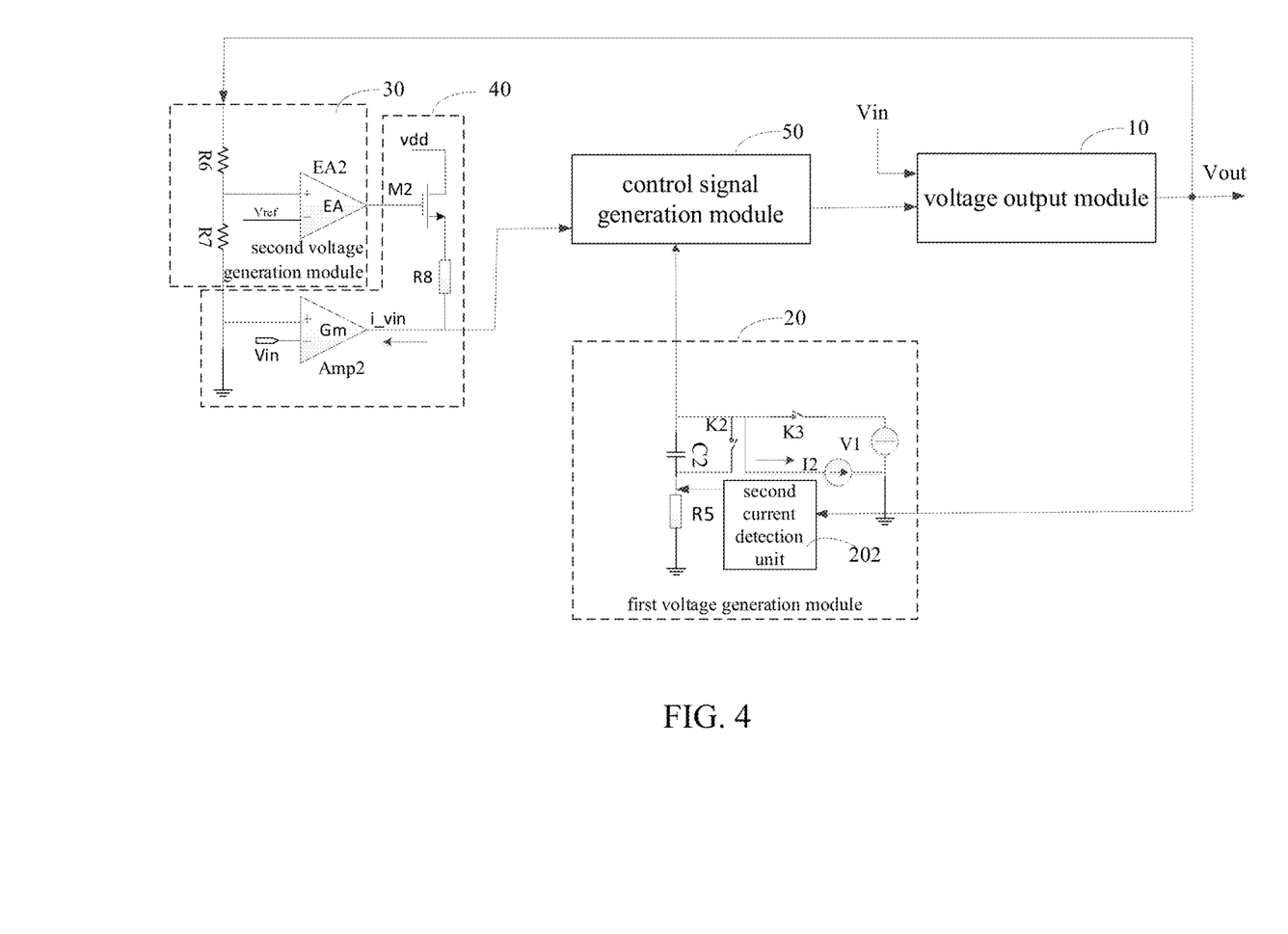
FIG. 4 is a schematic diagram illustrating a voltage regulation apparatus according to an embodiment of the present disclosure.

Referring to FIG. 4, it is a schematic diagram illustrating a voltage regulation apparatus according to an embodiment of the present disclosure.

In a possible embodiment, as shown in FIG. 4, the first voltage generation module 20 can include a fifth resistor R5, a second capacitor C2, a second current source I2, a first voltage source V1, a second switch K2, a third switch K3, and a second current detection unit 202, where:

a first terminal of the second capacitor C2 is electrically connected to all of a first terminal of the second switch K2, a first terminal of the third switch K3, a negative pole of the second current source I2, and the first input terminal of the comparator (not shown in FIG. 4), the second terminal of the second capacitor C2 is electrically connected to all of a second terminal of the second switch K2, a first terminal of the fifth resistor R5, and the second current detection unit 202, a second terminal of the third switch K3 is electrically connected to a position pole of the first voltage source V1, and all of the positive pole of the second current source I2, the negative pole of the first voltage source V1, and a second terminal of the fifth resistor R5 are grounded;

the second current detection unit 202 is configured to obtain the detected current and output the detected current to a first terminal of the fifth resistor R5;

where, in response to the second switch K2 and the third switch K3 being turned off, the first terminal of the second capacitor C2 is configured to output the first comparison voltage to the first input terminal of the comparator.

In a possible implementation, as shown in FIG. 4, the second voltage generation module 40 can include all of a sixth resistor R6, a seventh resistor R7, and a second error amplifier EA2; and the voltage regulation module 40 can include all of an eighth resistor R8, a second operational amplifier Amp2, and a second transistor M2, where:

a non-inverting input terminal of the second error amplifier EA2 is electrically connected to both a second terminal of the sixth resistor R6 and a first terminal of the seventh resistor R7, an inverting input terminal of the second error amplifier EA2 is configured to receive a reference voltage Vref, an output terminal of the second error amplifier EA2 is electrically connected to a grid of the second transistor M2, a drain of the second transistor M2 is configured to receive a supply voltage vdd, and a source of the second transistor M2 is electrically connected to a first terminal of the eighth resistor R8; and the inverting input terminal of the second operational amplifier Amp2 is configured to receive the input voltage Vin, both the non-inverting input terminal of the second operational amplifier Amp2 and a second terminal of the seventh resistor R7 are grounded, and the output terminal of the second operational amplifier Amp2 is electrically connected to both a second terminal of the eighth resistor R8 and the second input terminal of the comparator and configured to output the regulated second comparison voltage to the second input terminal of the second comparator.

In an example, as shown in FIG. 4, the second detection unit 202 can sample the current of the voltage output module 10 (which may be for example a falling edge of an inductor current) to obtain a detected current and input the detected current to the first terminal of the fifth resistor R5 and input a current of the second current source I2 to the first terminal of the second capacitor C2 as a ramp compensation current.

If the input voltage Vin jumps, for example, from Vin1 to Vin2, the amount of change in the input voltage Vin can be expressed as $\Delta Vin=V_{in2}-V_{in1}$; in this case, the duty cycle of the control signal (PWM signal) generated by the control signal generation module 50 changes from $D_1$ to $D_2$.

When Vin=Vin1, the input voltage at the first input terminal of the comparator in the control signal generation module 50 can be expressed as $V_{sum1}=V_{ramp1}+V_{sense1}$; when Vin=Vin2, the input voltage of the first input terminal of the comparator in the control signal generation module 50 can be expressed as $V_{sum2}=V_{ramp2}+V_{sense2}$, where $V_{ramp}$ (including $V_{ramp1}$ and $V_{ramp2}$) indicates a voltage difference across the second capacitor C2, and V sense (including $V_{sense1}$ and $V_{sense2}$) indicates a voltage difference across the fifth resistor R5; when the input voltage Vin changes from Vin1 to Vin2, the voltage change amount $\Delta V_{sum}$ at the first input terminal of the comparator is $V_{sum.vin2}-V_{sum.vin1}=\Delta V_{ramp}+\Delta V_{sense}$, where $\Delta V_{ramp}=V_{ramp2}-V_{ramp1}$, and $\Delta V_{sense}=V_{sense2}-V_{sense1}$.

As shown in FIG. 4, the voltage regulation module 40 of the embodiment of this disclosure is electrically connected to the second voltage generation module 30 to compensate for second comparison voltage output from the second voltage generation module 30.

When Vin=Vin1, the input voltage at the second input terminal of the comparator can be expressed as $V_{comp1}=V_{ea\_out1}-V_{th}-V_{in1}*gm2*R8$; when Vin=Vin2, the input voltage at the second input terminal of the comparator can be expressed as $V_{comp2}=V_{ea\_out2}-V_{th}-V_{in2}*gm2*R8$, where gm2 indicates a transconductance of the second operational amplifier Amp2, $V_{th}$ indicates the threshold voltage of the second transistor M2, $V_{ea\_out1}$ and $V_{ea\_out2}$ indicate two times of outputs of the first error amplifier EA1, and R8 indicates a resistance of the eighth resistor R8. Thus, the amount of change in the input voltage of the second input terminal can be obtained as $\Delta V_{comp}=V_{comp2}-V_{comp1}=\Delta V_{ramp}+\Delta V_{sense}$, i.e. $\Delta V_{comp}=V_{ea\_out2}-V_{ea\_out1}-\Delta V_{in}*gm2*R8$.

This embodiment of the present disclosure can select an appropriate first operational amplifier Amp2 and an eighth resistor R8 to satisfy: $\Delta V_{in}*gm2*R8=\Delta V_{ramp}+\Delta V_{sense}$ By such a configuration, the embodiment of the present disclosure can enable the voltage changes at the first input terminal and the second input terminal of the comparator of the control signal generation module 50 to be synchronized, such that it is possible to generate a control signal that changes with the input voltage Vin (the duty cycle of the PWM signal changes with the input voltage Vin), thereby reducing jitter of the output voltage Vout.

It should be noted that the present disclosure does not limit the specific implementation of the second detection unit 202 and those skilled in the art can implement detection of the current of the voltage output module 10 (a current of an inductor) with respect to relevant technology.

The above is an example of a voltage regulation module 40 electrically connected to a second voltage generation module 30 to compensate for the second comparison voltage. Below is an example description of the voltage regulation module 40 electrically connected to the first voltage generation module 20.

Figure 5:
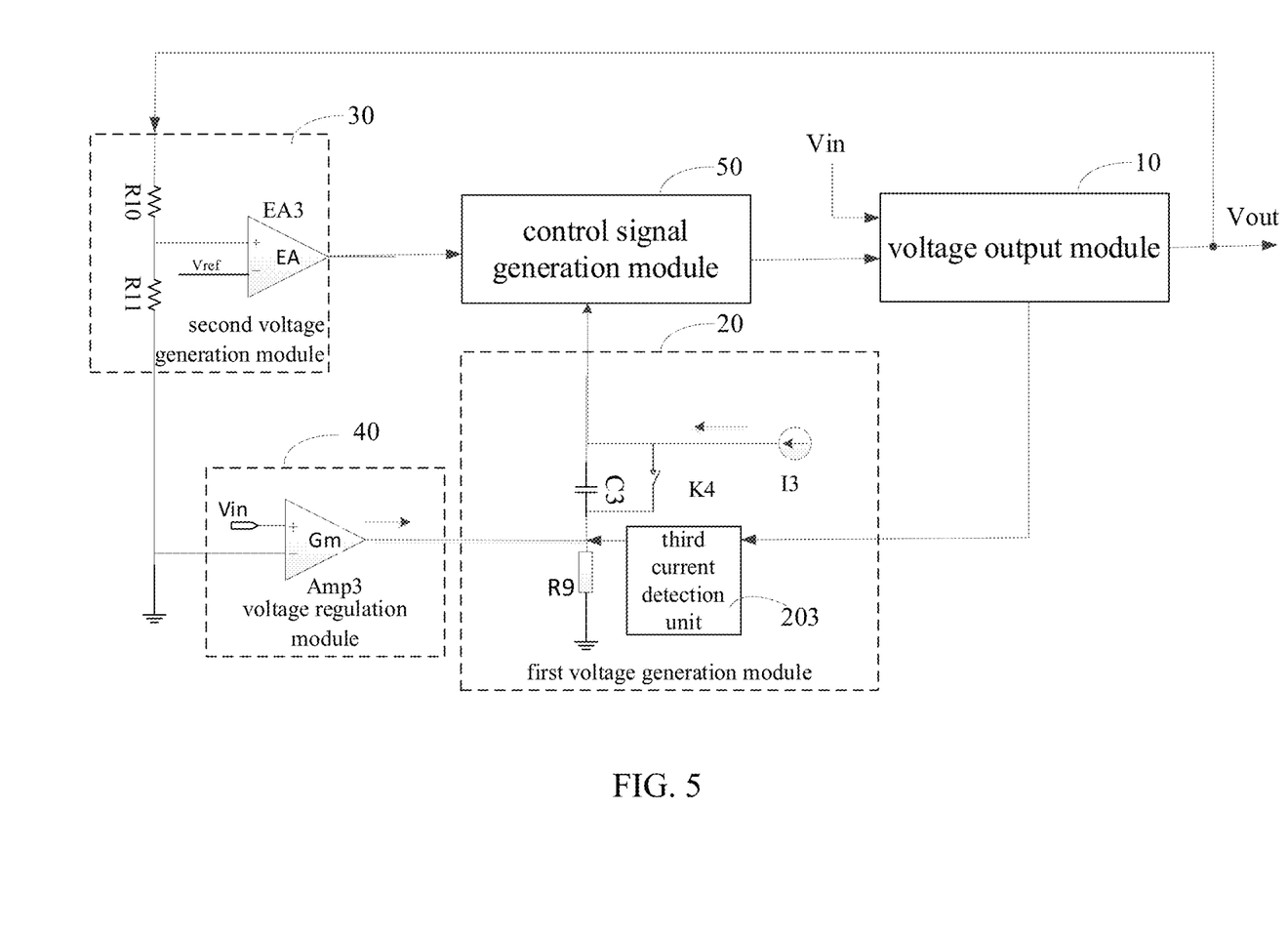
FIG. 5 is a schematic diagram illustrating a voltage regulation apparatus according to an embodiment of the present disclosure.

Referring to FIG. 5, it is a schematic diagram illustrating a voltage regulation apparatus according to an embodiment of the present disclosure.

In a possible embodiment, as shown in FIG. 5, the first voltage generation module 20 can include all of a ninth resistor R9, a third capacitor C3, a fourth switch K4, a third current source I3 and a third current detection unit 203; and the voltage regulation module 40 includes a third operational amplifier Amp3, where:

a first terminal of the third capacitor C3 is electrically connected to all of a first terminal of the fourth switch K4, a positive pole of the third current source I3 and a first input terminal of the comparator (not shown in FIG. 5);

the third current detection unit 203 is electrically connected to all of the voltage output module 10, a first terminal of the ninth resistor R9, a second terminal of the third capacitor C3, and the second terminal of the fourth switch K4 and configured to obtain the detected current and output the detected current to the first terminal of the ninth resistor R9;

a non-inverting input terminal of the third operational amplifier Amp3 is configured to input the input voltage Vin, and an inverting input terminal of the third operational amplifier Amp3 and a second terminal of the ninth resistor R9 are grounded, and where, in response to the fourth switch K4 being turned off, the first terminal of the third capacitor C3 outputs the regulated first comparison voltage to the first terminal of the comparator.

In a possible embodiment, as shown in FIG. 5, the second voltage generation module 30 can include all of a third error amplifier EA3, a tenth resistor R10, and an eleventh resistor R11, where:

a first terminal of the tenth resistor R10 is configured to input the output voltage Vout, a second terminal of the tenth resistor R10 is electrically connected to a first terminal of the eleventh resistor R11 and a non-inverting input terminal of the third error amplifier EA3, an inverting input terminal of the third error amplifier EA3 is configured to input a reference voltage Vref, a second terminal of the eleventh resistor R11 is grounded, and an output terminal of the third error amplifier EA3 is electrically connected to the second input terminal of the comparator and configured to output the second comparator voltage to the second input terminal of the comparator.

In an example, the detected current of the voltage output module 10 (which is for example a rising edge of the inductor current) can be obtained by the third detection unit 203 and the current at the third current source I3 is added to the first terminal of the third capacitor C3 as a ramp compensation current.

When no input voltage sampling compensation is introduced (i.e., when the voltage regulation module 40 is not introduced), if the input voltage Vin jumps, for example, from Vin1 to Vin2, then, the amount of change in the input voltage can be expressed as $\Delta Vin = V_{in2} - V_{in1}$. In this case, the duty cycle of the control signal output by the control signal generation module 50 changes from $D_1$ to $D_2$.

When Vin=Vin1, the input voltage at the first input terminal of the comparator in the control signal generation module 50 can be expressed as $V_{sum1} = V_{ramp1} + V_{sense1}$; when Vin=Vin2, the input voltage at the first input terminal of the comparator in the control signal generation module 50 can be expressed as $V_{sum2} = V_{ramp2} + V_{sense2}$ where $V_{ramp}$ (including $V_{ramp1}$ and $V_{ramp2}$) can indicate the voltage difference across of the third capacitance C3, $V_{sense}$ (including $V_{sense1}$ and $V_{sense2}$) can indicate the voltage difference across of the ninth resistor R3. When the input voltage Vin changes from Vin1 to Vin2, the amount of change in the input voltage at the first input terminal $\Delta V_{sum} = V_{sum2} - V_{sum1} = \Delta V_{ramp} + \Delta V_{sense}$, where $\Delta V_{ramp} = V_{ramp2} - V_{ramp1}$, $\Delta V_{sense} = V_{sense2} - V_{sense1}$.

Therefore, in order for the control signal generation module 50 to make a response quickly, when the input voltage Vin changes from Vin1 to Vin2, the second comparison voltage output by the second voltage generation module 30 needs to be changed from Vsum1 to Vsum2 accordingly.

As shown in FIG. 5, when the voltage regulation module 40 is introduced and electrically connected to the first terminal of the ninth resistor R9, the voltage regulation module 40 can compensate for the voltage at the first terminal of the ninth resistor R9 after sampling the input voltage Vin.

In one example, when Vin=Vin1, the input voltage at the first input terminal of the comparator can be expressed as $V_{sum1} = (I_{sense1} = (I_{sense1} + I_{ramp}) * R9 + V_{in1} * gm3 * R9 + V_{ramp1}$ or $V_{sum1} V_{sense1} + V_{in1} * gm3 * R9 + V_{ramp1}$; when Vin=Vin2, the input voltage at the first input terminal of the comparator can be expressed as $V_{sum2} = (I_{sense2} + I_{ramp}) * R9 + V_{in2} * gm3 * R9 + V_{ramp2}$ or $V_{sum2} = V_{sense2} + V_{in2} * gm3 * R9 + V_{ramp2}$ where gm3 indicates a transconductance of the third operational amplifier Amp3, R9 indicates a resistance of the ninth resistor R9, $I_{sense1}$ indicates the detected current when the input voltage is Vin1, $I_{sense2}$ indicates the detected current when the input voltage is Vin2, and $I_{ramp}$ indicates a current value of the fourth current source I3.

Embodiments of the present disclosure can select an appropriate third operational amplifier Amp3 and a ninth resistor R9, such that $V_{sum2} = V_{sum1}$, thereby ensuring that the second comparison voltage output by the second voltage generation module 30 does not change with the input voltage Vin. That is, when $V_{sum2} = V_{sum1}$, $V_{sum1} - V_{sum1} = V_{sense2} + V_{in2} * gm3 * R9 + V_{ramp2} - (V_{sense1} + V_{in1} * gm3 * R9 + V_{ramp1}) = 0$, i.e. $\Delta_{Vin} * gm3 * R9 + \Delta V_{ramp} + \Delta V_{sense} = 0$, where $\Delta V_{in} = V_{in2} - V_{in1}$, $\Delta V_{ramp} = V_{ramp2} - V_{ramp1}$, and $\Delta V_{sense} = V_{sense2} - V_{sense1}$.

By such a configuration, the embodiment of the present disclosure can enable the voltage changes at the first input terminal and the second input terminal of the comparator of the control signal generation module 50 to be synchronized, such that it is possible to generate a control signal that changes with the input voltage Vin (the duty cycle of the PWM signal changes with the input voltage Vin), thereby reducing jitter of the output voltage Vout.

It should be noted that the present disclosure does not limit the specific implementation of the first detection unit 203 and those skilled in the art can implement detection of the current of the voltage output module 10 (a current of an inductor) with respect to relevant technology.

The voltage regulation apparatus described above can be applied in a peak current sampling scenario. Below is an exemplary description of a valley current sampling scenario.

Figure 6:
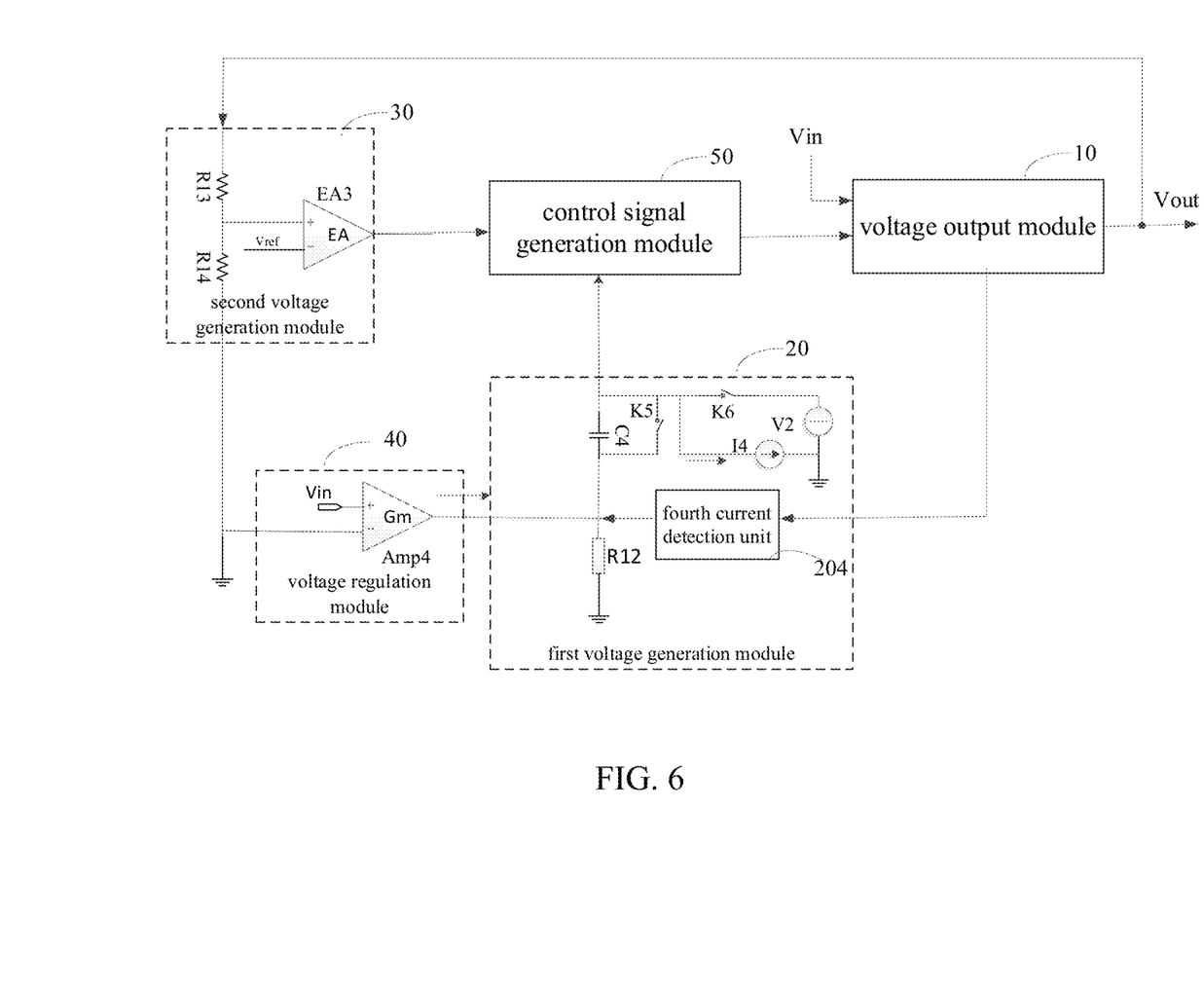
FIG. 6 is a schematic diagram illustrating a voltage regulation apparatus according to an embodiment of the present disclosure.

Referring to FIG. 6, it is a schematic diagram illustrating a voltage regulation apparatus according to an embodiment of the present disclosure.

In a possible embodiment, as shown in FIG. 6, the first voltage generation module 20 can include all of a twelfth resistor R12, a fourth capacitor C4, a fifth switch K5, a sixth switch K6, a fourth current source I4, a second voltage source V2, and a fourth current detection unit 204, and the voltage regulation module 40 can include a fourth operation amplifier Amp4, where:

the first terminal of the fourth capacitor C4 is electrically connected to all of a first terminal of the fifth switch K5, a first terminal of the sixth switch K6, a negative pole of the fourth current source I4, and a first input terminal of the comparator (not shown in FIG. 6), a second terminal of the fourth capacitor C4 is electrically connected to all of a first terminal of the twelfth resistor R12, an output terminal of the fourth operational amplifier Amp4, a second terminal of the fifth switch K5, and the fourth current detection unit, and the fourth current detection unit 204 is further electrically connected to the voltage output module and configured to obtain the detected current and output the detected current to the first terminal of the twelfth resistor R12;

a second terminal of the sixth switch K6 is electrically connected to a positive pole of the second voltage source V2, a negative pole of the second voltage source V2, a positive pole of the fourth current source I4, a second terminal of the twelfth resistor R12, and an inverting input terminal of the fourth operational amplifier Amp4 are grounded, and a non-inverting input terminal of the fourth operational amplifier Amp4 receives the input voltage Vin; and where, in response to the fifth switch K5 and the sixth switch K5 being turned off, the first terminal of the fourth capacitor C4 outputs the regulated first comparator voltage to the first input terminal of the comparator.

In an example, the fourth detection unit 202 can sample the current of the voltage output module 10 (for example, a falling edge of the inductor current) to obtain the detected current, and the current of the fourth current source is input to the first terminal of the fourth capacitor C4 as a ramp compensation current.

In an example, when no input voltage sampling compensation is introduced (i.e., the voltage regulation module 40 is not introduced), if the input voltage Vin jumps, for example, from Vin1 to Vin2, the amount of change in the input voltage Vin may be expressed as $\Delta Vin = V_{in2} - V_{in1}$. In this case, the duty cycle of the control signal output by the control signal generation module 50 changes from $D_1$ to $D_2$. When Vin=Vin1, the input voltage at the first input terminal of the comparator in the control signal generation module 50 can be expressed as $V_{sum1} = V_{ramp1} + V_{sense1}$; when Vin=Vin2, the input voltage at the first input terminal of the comparator can be expressed as $V_{sum2} = V_{ramp1} + V_{sense2}$, where $V_{ramp}$ (including $V_{ramp1}$ and $V_{ramp2}$) can indicate a voltage difference across the fourth capacitor C4 and $V_{sense}$ (including $V_{sense1}$ and $V_{sense2}$) can indicate a voltage difference across the twelfth resistor R12. When the input voltage Vin changes from Vin1 to Vin2, the amount of change in the input voltage at the first input terminal can be expressed as $\Delta V_{sum} = V_{sum2} - V_{sum1} = \Delta V_{ramp} + \Delta V_{sense}$, where $\Delta V_{ramp} = V_{ramp2} - V_{ramp1}$, and $\Delta V_{sense} = V_{sense2} - V_{sense1}$.

In an example, when the voltage regulation module 40 is introduced, as shown in FIG. 6, the voltage regulation module 40 can sample the input voltage Vin and regulate the first comparison voltage of the first voltage generation module 20.

In an embodiment, when Vin=Vin1, the input voltage at the first input terminal of the comparator in the control signal generation module 50 can be expressed as $V_{sum1} = V_{sense1} + V_{in1}*gm4*R12 + V_{ramp}$ or $V_{sum1} = (I_{sense1} - I_{ramp})*R12 + V_{in1}*gm4*R_{sense} + V_{ramp1}$; when Vin=Vin2, the input voltage at the first input terminal of the comparator in the control signal generation module 50 can be expressed as $V_{sum2} = (I_{sense2} - I_{ramp})*R12 + V_{in2}*gm4*R12 + V_{ramp2}$ or $V_{sum2} = V_{sense2} + V_{in2}*gm4*R12 + V_{ramp2}$, where gm4 indicates a transconductance of the fourth operational amplifier Amp4, R12 indicates a resistance of the twelfth resistor, 'sense' indicates a detected current when the input voltage is Vin1, $I_{sense2}$ indicates a detected current when the input voltage is Vin2, and Iramp indicates a current value of the fourth current source I4.

In an embodiment, it is possible to select an appropriate fourth operational amplifier Amp4 and a twelfth resistor R12 to satisfy $V_{sum2} = V_{sum1}$. In this way, it is possible to obtain $V_{sum2} - V_{sum1} = V_{sense2} + V_{in2}*gm4*R12 + V_{ramp2} - (V_{sense1} + V_{in1}*gm4*R12 + V_{ramp1}) = 0$. As long as $\Delta V_{in}*gm4*R12 + \Delta V_{ramp} + \Delta V_{sense} = 0$, ($\Delta V_{in} = V_{in2} - V_{in1}$, $\Delta V_{ramp} = V_{ramp2} - V_{ramp1}$, $\Delta V_{sense} = V_{sense2} - V_{sense1}$), the embodiment of the present disclosure can enable the voltage changes at the first input terminal and the second input terminal of the comparator of the control signal generation module 50 to be synchronized, such that it is possible to generate a control signal that changes with the input voltage Vin (the duty cycle of the PWM signal changes with the input voltage Vin), thereby reducing jitter of the output voltage Vout.

It should be noted that the present disclosure does not limit the embodiment of the fourth detection unit 204 and a person skilled in the art can implement the detection of the current (a current of the inductor) of the voltage output module 10 with respect to relevant technology.

Figure 7:
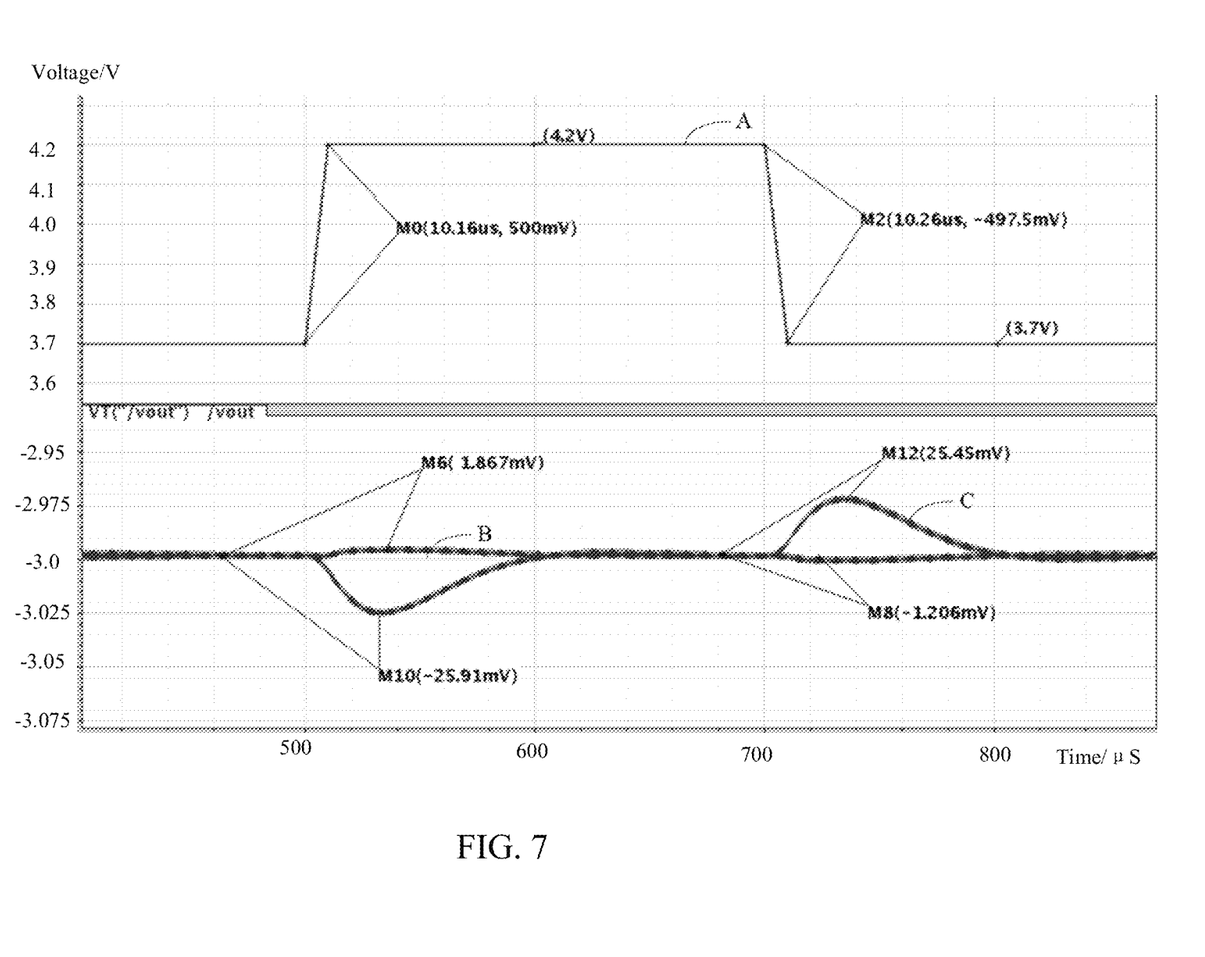
FIG. 7 is a schematic diagram illustrating an effect of a voltage regulation apparatus according to an embodiment of the present disclosure.

Referring to FIG. 7, it illustrates a schematic diagram of the effect of a voltage regulation apparatus according to an embodiment of the present disclosure.

As shown in FIG. 7, a graph A shows that the input voltage Vin jumps at a rate of ±500 mV/10 µS, a graph B shows the output voltage Vout in a technical solution of the present disclosure, and a graph C shows the output voltage Vout in a relevant technology. As can be seen, the jitter of the output voltage in the relevant technology shown in graph C is at least 25 mV while the jitter of the output voltage in the technical solution of the present disclosure (graph B) is less than 2 mV.

The present disclosure makes it possible to synchronize the voltage changes at the first input terminal and the second input terminal of the comparator of the control signal generation module 50, such that it is possible to generate a control signal that changes with the input voltage Vin (the duty cycle of the PWM signal changes with the input voltage Vin), thereby reducing jitter of the output voltage Vout.

The above mentioned are only embodiments of the present disclosure and the scope of protection of the present disclosure is not limited thereto. Any changes or substitutions that can be easily conceived of by a person skilled in the art within the technical scope disclosed in the present disclosure shall be covered by the scope of protection of the present disclosure. Accordingly, the scope of protection of the present disclosure should fall into the scope of protection of the claims.

What is claimed is:

1. A voltage regulation apparatus, comprising:
a voltage output module configured to receive an input voltage and a control signal, and obtain an output voltage based on the control signal and the input voltage;
a first voltage generation module, electrically connected to the voltage output module and configured to detect a current of the voltage output module to obtain a detected current, and obtain a first comparison voltage based on the detected current;
a second voltage generation module, electrically connected to the voltage output module and configured to generate a second comparison voltage based on the output voltage;
a voltage regulation module configured to regulate the first comparison voltage based on the input voltage such that the first voltage generation module outputs a regulated first comparison voltage, or regulate the second comparison voltage based on the input voltage such that the second voltage generation module outputs a regulated second comparison voltage; and
a control signal generation module, electrically connected to the first voltage generation module and the second voltage generation module, and configured to output a control signal based on the regulated first comparison voltage or the regulated second comparison voltage, such that the voltage output module obtains the output voltage based on the control signal and the input voltage.

2. The apparatus according to claim 1, wherein the control signal generation module comprises a comparator and a PWM (Pulse Width Modulation) signal generator, and the control signal includes a PWM signal,
wherein, a first input terminal of the comparator is electrically connected to the first voltage generation module, a second input terminal of the comparator is electrically connected to the second voltage generation module, an output terminal of the comparator is electrically connected to an input terminal of the PWM signal generator, and the comparator is configured to compare an output signal of the first voltage generation module with an output signal of the second voltage generation module and output a comparison result; and
the output terminal of the PWM signal generator is electrically connected to the voltage output module, and the PWM signal generator is configured to regulate a duty cycle of the PWM signal based on the comparison result output from the comparator and output the control signal with regulated duty cycle.

3. The apparatus according to claim 2, wherein the first voltage generation module comprises a first capacitor, a first resistor, a first switch, a first current source, and a first current detection unit, wherein:
a first terminal of the first capacitor is electrically connected to a first terminal of the first switch, a positive pole of the first current source, and the first input terminal of the comparator, a second terminal of the first capacitor is electrically connected to a second terminal of the first switch, a first terminal of the first resistor, and the first current detection unit, and a second terminal of the first resistor is grounded;
the first current detection unit is electrically connected to the voltage output module and configured to obtain the detected current and output the detected current to the first terminal of the first resistor; and
in response to the first switch being turned off, the first terminal of the first capacitor outputs the first comparison voltage to the first input terminal of the comparator.

4. The apparatus according to claim 2, wherein the second voltage generation module comprises a first error amplifier, a second resistor, and a third resistor, and the voltage regulation module comprises a first operational amplifier, a first transistor, and a fourth resistor,
wherein, a non-inverting input terminal of the first error amplifier is electrically connected to a second terminal of the second resistor and a first terminal of the third resistor, an inverting input terminal of the first error amplifier is configured to receive a reference voltage, and an output terminal of the first error amplifier is electrically connected to a grid of the first transistor;
a drain of the first transistor is configured to receive a power supply voltage, and a source of the first transistor is electrically connected to a first terminal of the fourth resistor, an output terminal of the first operational amplifier, and the second input terminal of the comparator;
a non-inverting input terminal of the first operational amplifier is configured to input the input voltage, and an inverting input terminal of the first operational amplifier, a second terminal of the third resistor, and a second terminal of the fourth resistor are grounded.

5. The apparatus according to claim 2, wherein the first voltage generation module comprises a fifth resistor, a second capacitor, a second current source, a first voltage source, a second switch, a third switch, and a second current detection unit,
wherein, a first terminal of the second capacitor is electrically connected to a first terminal of the second switch, a first terminal of the third switch, a negative pole of the second current source, and the first input terminal of the comparator, the second terminal of the second capacitor is electrically connected to a second terminal of the second switch, a first terminal of the fifth resistor, and the second current detection unit, a second terminal of the third switch is electrically connected to a position pole of the first voltage source, and the positive pole of the second current source, the negative pole of the first voltage source, and a second terminal of the fifth resistor are grounded;
the second current detection unit is configured to obtain the detected current and output the detected current to the first terminal of the fifth resistor, and
in response to the second switch and the third switch being turned off, the first terminal of the second capacitor is configured to output the first comparison voltage to the first input terminal of the comparator.

6. The apparatus according to claim 2, wherein the second voltage generation module comprises a sixth resistor, a seventh resistor, and a second error amplifier, and the voltage regulation module includes an eighth resistor, a second operational amplifier, and a second transistor,
wherein, a non-inverting input terminal of the second error amplifier is electrically connected to a second terminal of the sixth resistor and a first terminal of the seventh resistor, an inverting input terminal of the second error amplifier is configured to receive a reference voltage, an output terminal of the second error amplifier is electrically connected to a grid of the second transistor, a drain of the second transistor is configured to receive a power supply voltage, and a source of the second transistor is electrically connected to a first terminal of the eighth resistor, and an inverting input terminal of the second operational amplifier is configured to receive the input voltage, the non-inverting input terminal of the second operational amplifier and a second terminal of the seventh resistor are grounded, and an output terminal of the second operational amplifier is electrically connected to a second terminal of the eighth resistor and the second input terminal of the comparator and configured to output the regulated second comparison voltage to the second input terminal of the second comparator.

7. The apparatus according to claim 2, wherein the first voltage generation module comprises a ninth resistor, a third capacitor, a fourth switch, a third current source, and a third current detection unit, and the voltage regulation module includes a third operational amplifier, wherein, a first terminal of the third capacitor is electrically connected to first terminal of the fourth switch, a positive pole of the third current source, and a first input terminal of the comparator;

the third current detection unit is electrically connected to the voltage output module, a first terminal of the ninth resistor, a second terminal of the third capacitor, and a second terminal of the fourth switch, and configured to obtain the detected current and output the detected current to the first terminal of the ninth resistor, a non-inverting input terminal of the third operational amplifier is configured to input the input voltage, and an inverting input terminal of the third operational amplifier and a second terminal of the ninth resistor are grounded, and in response to the fourth switch being turned off, the first terminal of the third capacitor outputs the regulated first comparison voltage to the first input terminal of the comparator.

8. The apparatus according to claim 2, wherein the second voltage generation module comprises a third error amplifier, a tenth resistor, and an eleventh resistor, wherein, a first terminal of the tenth resistor is configured to input the output voltage, a second terminal of the tenth resistor is electrically connected to a first terminal of the eleventh resistor and a non-inverting input terminal of the third error amplifier, an inverting input terminal of the third error amplifier is configured to input a reference voltage, a second terminal of the eleventh resistor is grounded, and an output terminal of the third error amplifier is electrically connected to a second input terminal of the comparator and configured to output the second comparator voltage to the second input terminal of the comparator.

9. The apparatus according to claim 2, wherein the first voltage generation module comprises a twelfth resistor, a fourth capacitor, a fifth switch, a sixth switch, a fourth current source, a second voltage source, and a fourth current detection unit, and the voltage regulation module includes a fourth operational amplifier, wherein, a first terminal of the fourth capacitor is electrically connected to a first terminal of the fifth switch, a first terminal of the sixth switch, a negative pole of the fourth current source, and the first input terminal of the comparator, a second terminal of the fourth capacitor is electrically connected to a first terminal of the twelfth resistor, an output terminal of the fourth operational amplifier, a second terminal of the fifth switch, and the fourth current detection unit, and the fourth current detection unit is further electrically connected to the voltage output module and configured to obtain the detected current and output the detected current to the first terminal of the twelfth resistor;

a second terminal of the sixth switch is electrically connected to a positive pole of the second voltage source, a negative pole of the second voltage source, a positive pole of the fourth current source, a second terminal of the twelfth resistor, and an inverting input terminal of the fourth operational amplifier are grounded, and a non-inverting input terminal of the fourth operational amplifier receives the input voltage, and in response to the fifth switch and the sixth switch being turned off, the first terminal of the fourth capacitor outputs the regulated first comparison voltage to the first input terminal of the comparator.

10. A chip, comprising:

a voltage regulation apparatus comprising:

a voltage output module configured to receive an input voltage and a control signal, and obtain an output voltage based on the control signal and the input voltage;

a first voltage generation module, electrically connected to the voltage output module and configured to detect a current of the voltage output module to obtain a detected current, and obtain a first comparison voltage based on the detected current;

a second voltage generation module, electrically connected to the voltage output module and configured to generate a second comparison voltage based on the output voltage;

a voltage regulation module configured to regulate the first comparison voltage based on the input voltage such that the first voltage generation module outputs a regulated first comparison voltage, or regulate the second comparison voltage based on the input voltage such that the second voltage generation module outputs a regulated second comparison voltage; and a control signal generation module, electrically connected to the first voltage generation module and the second voltage generation module, and configured to output a control signal based on the regulated first comparison voltage or the regulated second comparison voltage, such that the voltage output module obtains the output voltage based on the control signal and the input voltage.

11. The chip according to claim 10, wherein the control signal generation module comprises a comparator and a PWM (Pulse Width Modulation) signal generator, and the control signal includes a PWM signal, wherein, a first input terminal of the comparator is electrically connected to the first voltage generation module, a second input terminal of the comparator is electrically connected to the second voltage generation module, an output terminal of the comparator is electrically connected to an input terminal of the PWM signal generator, and the comparator is configured to compare an output signal of the first voltage generation module with an output signal of the second voltage generation module and output a comparison result; and the output terminal of the PWM signal generator is electrically connected to the voltage output module, and the PWM signal generator is configured to regulate a duty cycle of the PWM signal based on the comparison result output from the comparator and output the control signal with regulated duty cycle.

12. The chip according to claim 11, wherein the first voltage generation module comprises a first capacitor, a first resistor, a first switch, a first current source, and a first current detection unit, wherein:
- a first terminal of the first capacitor is electrically connected to a first terminal of the first switch, a positive pole of the first current source, and the first input terminal of the comparator, a second terminal of the first capacitor is electrically connected to a second terminal of the first switch, a first terminal of the first resistor, and the first current detection unit, and a second terminal of the first resistor is grounded;
- the first current detection unit is electrically connected to the voltage output module and configured to obtain the detected current and output the detected current to the first terminal of the first resistor; and
- in response to the first switch being turned off, the first terminal of the first capacitor outputs the first comparison voltage to the first input terminal of the comparator.

13. The chip according to claim 11, wherein the second voltage generation module comprises a first error amplifier, a second resistor, and a third resistor, and the voltage regulation module comprises a first operational amplifier, a first transistor, and a fourth resistor,
- wherein, a non-inverting input terminal of the first error amplifier is electrically connected to a second terminal of the second resistor and a first terminal of the third resistor, an inverting input terminal of the first error amplifier is configured to receive a reference voltage, and an output terminal of the first error amplifier is electrically connected to a grid of the first transistor;
- a drain of the first transistor is configured to receive a power supply voltage, and a source of the first transistor is electrically connected to a first terminal of the fourth resistor, an output terminal of the first operational amplifier, and the second input terminal of the comparator;
- a non-inverting input terminal of the first operational amplifier is configured to input the input voltage, and
- an inverting input terminal of the first operational amplifier, a second terminal of the third resistor, and a second terminal of the fourth resistor are grounded.

14. The chip according to claim 11, wherein the first voltage generation module comprises a fifth resistor, a second capacitor, a second current source, a first voltage source, a second switch, a third switch, and a second current detection unit,
- wherein, a first terminal of the second capacitor is electrically connected to a first terminal of the second switch, a first terminal of the third switch, a negative pole of the second current source, and the first input terminal of the comparator, the second terminal of the second capacitor is electrically connected to a second terminal of the second switch, a first terminal of the fifth resistor, and the second current detection unit, a second terminal of the third switch is electrically connected to a position pole of the first voltage source, and the positive pole of the second current source, the negative pole of the first voltage source, and a second terminal of the fifth resistor are grounded;
- the second current detection unit is configured to obtain the detected current and output the detected current to the first terminal of the fifth resistor, and
- in response to the second switch and the third switch being turned off, the first terminal of the second capacitor is configured to output the first comparison voltage to the first input terminal of the comparator.

15. The chip according to claim 11, wherein the second voltage generation module comprises a sixth resistor, a seventh resistor, and a second error amplifier, and the voltage regulation module includes an eighth resistor, a second operational amplifier, and a second transistor,
- wherein, a non-inverting input terminal of the second error amplifier is electrically connected to a second terminal of the sixth resistor and a first terminal of the seventh resistor, an inverting input terminal of the second error amplifier is configured to receive a reference voltage, an output terminal of the second error amplifier is electrically connected to a grid of the second transistor, a drain of the second transistor is configured to receive a power supply voltage, and a source of the second transistor is electrically connected to a first terminal of the eighth resistor, and
- an inverting input terminal of the second operational amplifier is configured to receive the input voltage, the non-inverting input terminal of the second operational amplifier and a second terminal of the seventh resistor are grounded, and an output terminal of the second operational amplifier is electrically connected to a second terminal of the eighth resistor and the second input terminal of the comparator and configured to output the regulated second comparison voltage to the second input terminal of the second comparator.

16. The chip according to claim 11, wherein the first voltage generation module comprises a ninth resistor, a third capacitor, a fourth switch, a third current source, and a third current detection unit, and the voltage regulation module includes a third operational amplifier,
- wherein, a first terminal of the third capacitor is electrically connected to first terminal of the fourth switch, a positive pole of the third current source, and a first input terminal of the comparator;
- the third current detection unit is electrically connected to the voltage output module, a first terminal of the ninth resistor, a second terminal of the third capacitor, and a second terminal of the fourth switch, and configured to obtain the detected current and output the detected current to the first terminal of the ninth resistor,
- a non-inverting input terminal of the third operational amplifier is configured to input the input voltage, and an inverting input terminal of the third operational amplifier and a second terminal of the ninth resistor are grounded, and
- in response to the fourth switch being turned off, the first terminal of the third capacitor outputs the regulated first comparison voltage to the first input terminal of the comparator.

17. The chip according to claim 11, wherein the second voltage generation module comprises a third error amplifier, a tenth resistor, and an eleventh resistor,
- wherein, a first terminal of the tenth resistor is configured to input the output voltage, a second terminal of the tenth resistor is electrically connected to a first terminal of the eleventh resistor and a non-inverting input terminal of the third error amplifier, an inverting input terminal of the third error amplifier is configured to input a reference voltage, a second terminal of the eleventh resistor is grounded, and an output terminal of the third error amplifier is electrically connected to a second input terminal of the comparator and configured to output the second comparator voltage to the second input terminal of the comparator.

18. The chip according to claim 11, wherein the first voltage generation module comprises a twelfth resistor, a fourth capacitor, a fifth switch, a sixth switch, a fourth current source, a second voltage source, and a fourth current detection unit, and the voltage regulation module includes a fourth operational amplifier, wherein, a first terminal of the fourth capacitor is electrically connected to a first terminal of the fifth switch, a first terminal of the sixth switch, a negative pole of the fourth current source, and the first input terminal of the comparator, a second terminal of the fourth capacitor is electrically connected to a first terminal of the twelfth resistor, an output terminal of the fourth operational amplifier, a second terminal of the fifth switch, and the fourth current detection unit, and the fourth current detection unit is further electrically connected to the voltage output module and configured to obtain the detected current and output the detected current to the first terminal of the twelfth resistor;

a second terminal of the sixth switch is electrically connected to a positive pole of the second voltage source, a negative pole of the second voltage source, a positive pole of the fourth current source, a second terminal of the twelfth resistor, and an inverting input terminal of the fourth operational amplifier are grounded, and a non-inverting input terminal of the fourth operational amplifier receives the input voltage, and in response to the fifth switch and the sixth switch being turned off, the first terminal of the fourth capacitor outputs the regulated first comparison voltage to the first input terminal of the comparator.

19. An electronic device, comprising:
a chip comprising a voltage regulation apparatus, the voltage regulation apparatus comprising:
a voltage output module configured to receive an input voltage and a control signal, and obtain an output voltage based on the control signal and the input voltage;
a first voltage generation module, electrically connected to the voltage output module and configured to detect a current of the voltage output module to obtain a detected current, and obtain a first comparison voltage based on the detected current;
a second voltage generation module, electrically connected to the voltage output module and configured to generate a second comparison voltage based on the output voltage;
a voltage regulation module configured to regulate the first comparison voltage based on the input voltage such that the first voltage generation module outputs a regulated first comparison voltage, or regulate the second comparison voltage based on the input voltage such that the second voltage generation module outputs a regulated second comparison voltage; and
a control signal generation module, electrically connected to the first voltage generation module and the second voltage generation module, and configured to output a control signal based on the regulated first comparison voltage or the regulated second comparison voltage, such that the voltage output module obtains the output voltage based on the control signal and the input voltage.

20. The electronic device according to claim 19, wherein the control signal generation module comprises a comparator and a PWM (Pulse Width Modulation) signal generator, and the control signal includes a PWM signal, wherein, a first input terminal of the comparator is electrically connected to the first voltage generation module, a second input terminal of the comparator is electrically connected to the second voltage generation module, an output terminal of the comparator is electrically connected to an input terminal of the PWM signal generator, and the comparator is configured to compare an output signal of the first voltage generation module with an output signal of the second voltage generation module and output a comparison result; and the output terminal of the PWM signal generator is electrically connected to the voltage output module, and the PWM signal generator is configured to regulate a duty cycle of the PWM signal based on the comparison result output from the comparator and output the control signal with regulated duty cycle.

* * * * *